United States Patent
Martin et al.

(10) Patent No.: US 10,282,194 B2
(45) Date of Patent: May 7, 2019

(54) METHODS AND SYSTEMS TO UPDATE A VEHICLE COMPUTING SYSTEM

(71) Applicant: FORD GLOBAL TECHNOLOGIES, LLC, Dearborn, MI (US)

(72) Inventors: Douglas Raymond Martin, Canton, MI (US); Mark Anthony Rockwell, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 551 days.

(21) Appl. No.: 14/507,955

(22) Filed: Oct. 7, 2014

(65) Prior Publication Data
US 2016/0098266 A1   Apr. 7, 2016

(51) Int. Cl.
G06F 8/654 (2018.01)
H04L 29/08 (2006.01)
G06F 9/445 (2018.01)

(52) U.S. Cl.
CPC ............. *G06F 8/654* (2018.02); *H04L 67/10* (2013.01); *H04L 67/125* (2013.01)

(58) Field of Classification Search
CPC ................. G06F 8/60; G06F 8/65; G06F 8/67
See application file for complete search history.

(56) References Cited

U.S. PATENT DOCUMENTS

| | | | |
|---|---|---|---|
| 5,630,139 A | 5/1997 | Ozaki | |
| 6,047,128 A * | 4/2000 | Zander | G06F 8/60 717/173 |
| 6,594,723 B1 * | 7/2003 | Chapman | G06F 8/65 711/103 |
| 2003/0084206 A1 * | 5/2003 | Floman | G06F 9/445 710/1 |
| 2004/0021437 A1 * | 2/2004 | Maslov | B60L 8/00 318/400.01 |
| 2004/0261072 A1 * | 12/2004 | Herle | G06F 8/65 717/171 |
| 2006/0259207 A1 * | 11/2006 | Natsume | G06F 8/65 701/1 |
| 2007/0067763 A1 * | 3/2007 | Sonbarse | G06F 8/67 717/168 |
| 2011/0099544 A1 * | 4/2011 | Haramiishi | G06F 8/665 717/168 |

(Continued)

FOREIGN PATENT DOCUMENTS

FR    2779554 A1   12/1999

*Primary Examiner* — Lewis A Bullock, Jr.
*Assistant Examiner* — Mohammad H Kabir
(74) *Attorney, Agent, or Firm* — Frank Lollo; Brooks Kushman P.C.

(57) ABSTRACT

A vehicle computing system for a vehicle includes a first and second memory device (e.g., erasable programmable read only memory (EEPROM)). The system further includes a circuit that selectively switches between the first and second memory device. The system further includes a first vehicle control module configured to receive notification that a software update is available at the second memory device. The first vehicle control module controls the circuit to switch from the first memory device to the second memory device at an initialization event. The first vehicle control module executes the software update based on communication with the second memory device.

10 Claims, 5 Drawing Sheets

(56) References Cited

U.S. PATENT DOCUMENTS

2013/0305238 A1* 11/2013 Frayssignes .............. G06F 8/65
717/173
2015/0040113 A1* 2/2015 Muench-Casanova ......................
G06F 9/4406
717/168
2015/0301821 A1* 10/2015 Danne .................... H04L 67/06
717/169

* cited by examiner

METHODS AND SYSTEMS TO UPDATE A VEHICLE COMPUTING SYSTEM

TECHNICAL FIELD

The present disclosure relates to a system and method for flashing a control module.

BACKGROUND

To update a software version of a component of a vehicle, the vehicle may be driven to a dealership and serviced by a technician. The technician may utilize a system that tracks the individual software levels of components in the vehicle as well as available software updates. The technician may manually apply the software updates indicated by the system and record any changes back into the system. The software update may be done while the vehicle is inoperable.

SUMMARY

In one embodiment, a vehicle computing system for a vehicle includes a first memory device in communication with a first processor for executing one or more vehicle operations. The system further includes a second memory device in communication with a second processor for receiving software updates. The system includes a first switch circuit that selectively switches between the first processor and the first and second memory device and a second switch circuit that selectively switches between the second processor and the first and second memory device. The first processor may be configured to receive notification that a software update is available at the second memory device. The first processor may control the first switch circuit to toggle communication from the first memory device to the second memory device. The first processor may execute the software update from the second memory device.

In one embodiment, a circuit comprises a first processor configured for vehicle operation and a second processor configured for software updates. The circuit may further comprise a first and second memory device configured to communicate with the first and second processor. The circuit may further comprise a first switch configured to selectively switch between the first processor and the first and second memory device and a second switch configured to selectively switch between the second processor and the first and second memory device. In response to a software update at the second memory device via the second processor, the switch toggles to shift communication between the first processor from the first memory device to the second memory device.

In one embodiment, a vehicle software update method may receive a software update at a first memory device during vehicle operation. The method may receive notification at a first controller that the software update is available at the first memory device. The method may control a circuit to switch communication between the first controller with a second memory device to the first memory device. The method may execute the software update from the first memory device at the first controller.

DETAILED DESCRIPTION

Figure 1:
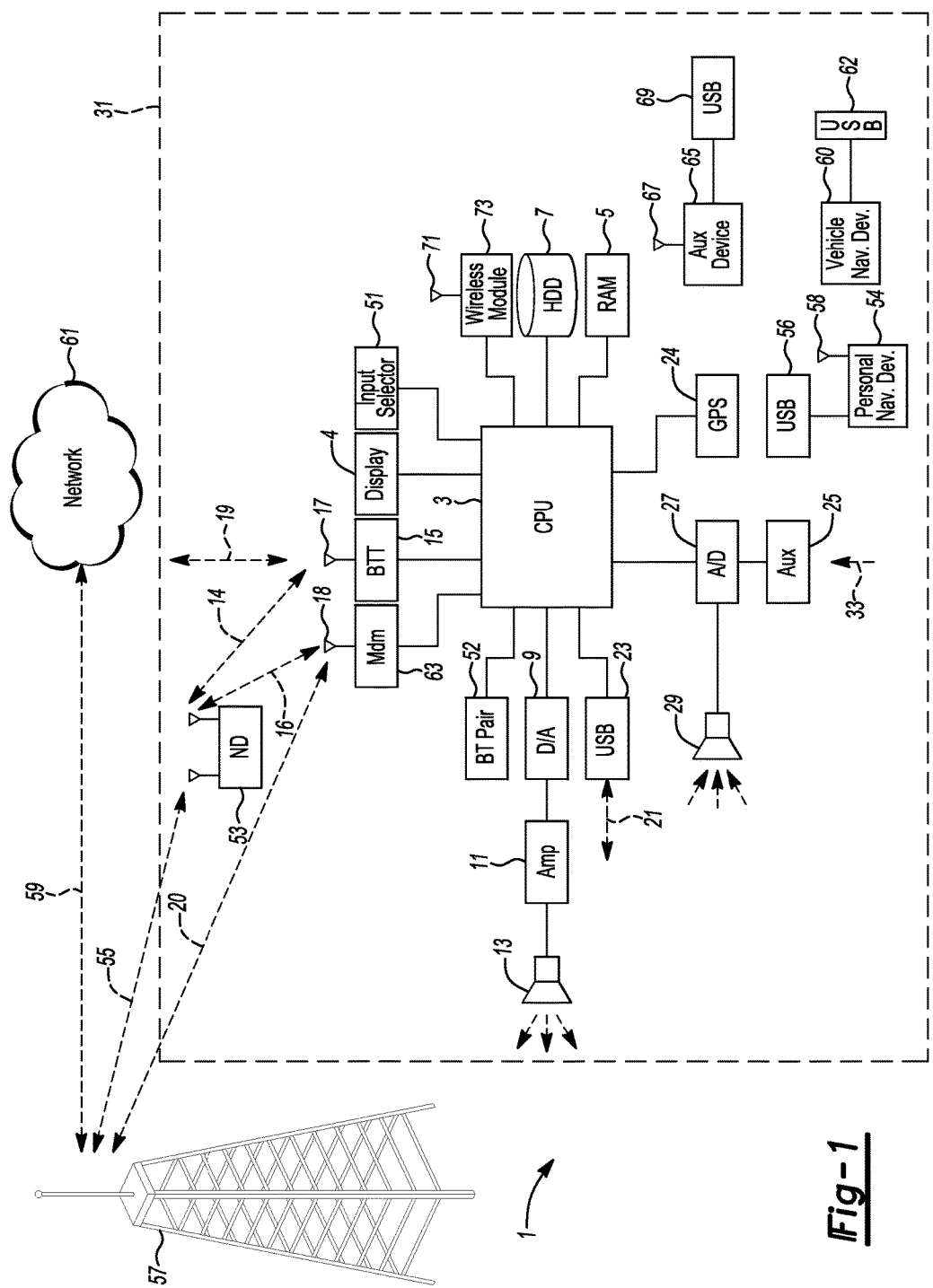
FIG. 1 illustrates an example block topology for a vehicle-based computing system for a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This invention disclosure relates to a system and method for improving the updating and flashing of new software at a vehicle computing system. For example, when receiving a software upgrade for a vehicle through a flash drive sent to the customer or at the dealer, it may be necessary to have the vehicle disabled (with electronics on) during the software update/flashing process. This is an inconvenience to the customer while waiting for an extended period of time to allow for the update to complete. During the update/flashing process of a control module, the operator may not be able to leave the vehicle unattended and the vehicle may be inoperable.

This disclosure may utilize the vehicle computing system comprising an address bus design that allows for two or more memory devices (e.g., electrical erasable programmable read only memory (EEPROM)) to exist. For example, a first memory device (e.g., first EEPROM) is wired to operate the vehicle system while the second memory device (e.g., second EEPROM) is wired to accept a software update flash. When the software update is complete at the second EEPROM, the two sets of address lines are switched (swapped) when the vehicle ignition switch is turned off. From that point forward until the next flash event, the second EEPROM that took the flash may operate the system while the first EEPROM with the obsolete software is ready and waiting to accept the next flash.

The disclosure relates to a system and method for updating software at one or more control modules of the vehicle computing system during vehicle operation. The system and method disclosed may update software without causing interruption to the operation of the vehicle. The updated software may be saved at the vehicle using an additional memory device circuit designated for software updates until the vehicle computing system provides a request to implement the updated software. The additional memory device circuit may include, but is not limited to, a switch to enable the selective switching between one or more memory devices, one or more memory devices, and a controller designated for receiving software updates to flash the selected memory device.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. An additional processor (not shown) may control at least some portion of a software update for the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory. The system may comprise one or more additional memory devices (not shown). The additional memory device may be configured with a switch (not shown) for enabling the addition processor to transmit software updates to the additional memory device without interruption to the operation of the vehicle-based computing system 1.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
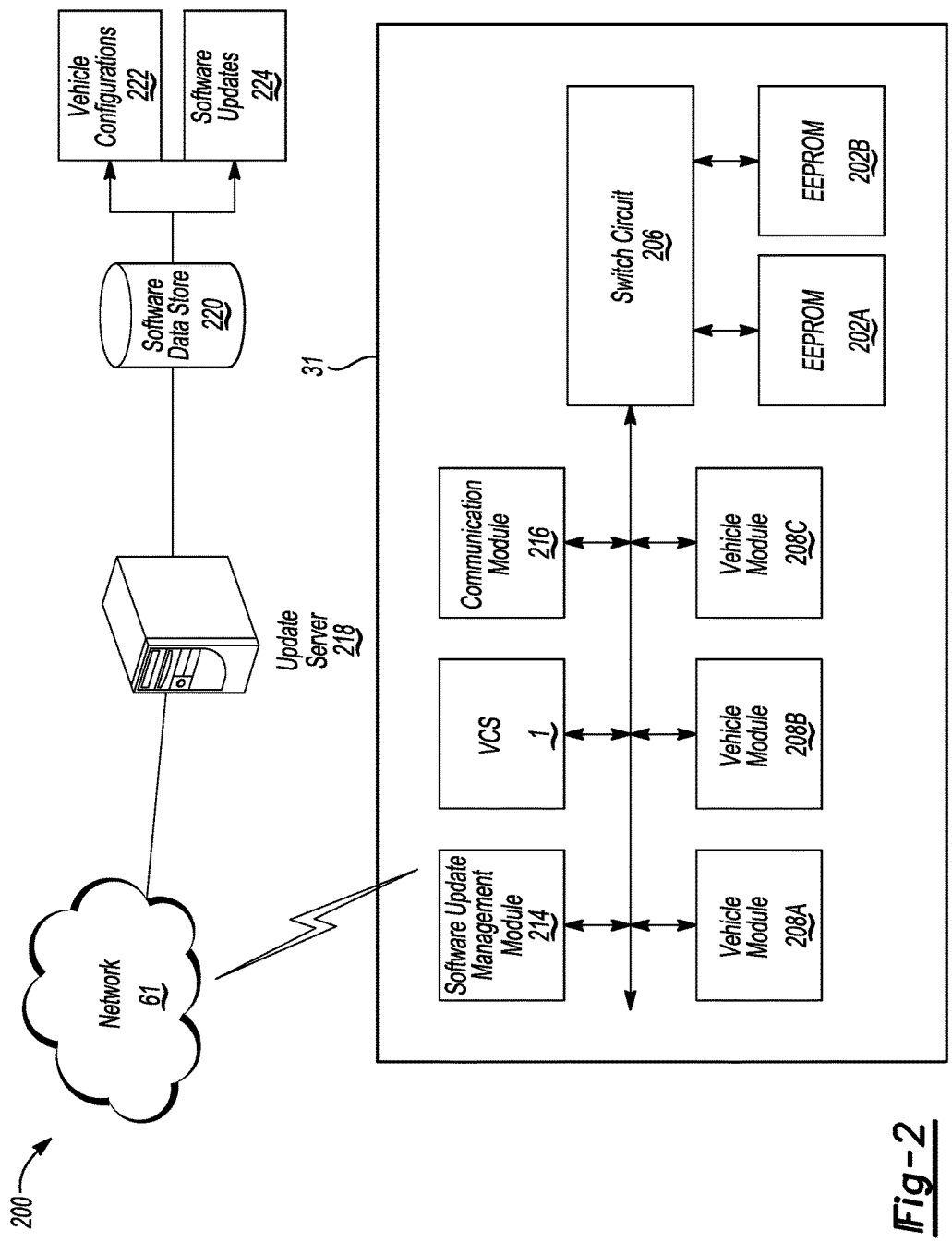
FIG. 2 illustrates an exemplary vehicle system including a software update management module.

The VCS 1 may be configured with two or more memory devices (e.g., EEPROMs 202) as shown in FIG. 2. The two or more EEPROMs 202 may be configured such that the system 200 may assign an EEPROM 202 to communicate with the CPU 3 via a switch circuit while the other EEPROM 202 communicates with a second CPU (not shown) to receive a software update. The second CPU may receive the software update during vehicle operation. The second CPU may be in communication with one or more modules 208 to receive a software update. The one or more modules 208 may include, but are not limited to, an embedded modem, an embedded cellular telephone, a short range wireless module used to enable the remote nomadic device 53 to communicate with the VCS 1, a USB 23 module, and/or a combination thereof.

For example, the VCS 1 may be configured to monitor the software status of the one or more EEPROMs 202. If the EEPROM 202 that is not in current communication with the CPU 1 has received a software update via the second CPU, the VCS 1 may allow the software update to be executed by the VCS 1 once an initialization event has taken place. In one embodiment, the initialization event is an ignition key-on event, an ignition key-off event, and/or a user initiated request to enable initialization of the system. In response to the initialization event, the VCS 1 may switch the CPU 3 to receive the software at the EEPROM 202 that has the updated software. The CPU 3 may execute the updated software received from the EEPROM 202.

FIG. 2 illustrates an exemplary vehicle 31 system 200 for providing software updates to the vehicle 31. The system 200 includes the VCS 1 in communication over the network 61 with an update server 218. The update server 218 may communicate with a software data store 220 storing vehicle configurations 222 and software updates 224. The system 200 further includes a software update management module 214 in communication with the VCS 1 and various modules 208 of the vehicle 31 and configured to install software updates 224. The VCS 1 may further include a software update application (not shown) configured to allow the user to control the application of software updates 224 performed by way of the software update management module 214. While an exemplary system 200 is shown in FIG. 2, the exemplary components illustrated in the Figure are not intended to be limiting. Indeed, the system 200 may have more or fewer components, and additional or alternative components and/or implementations may be used. As an example, while several vehicle modules 208 are illustrated, the systems 200 may include more or fewer modules 208. As another example, while the software update management module 214 is illustrated as a separate component, in other examples it may be combined with other components, e.g., integrated with the VCS 1 as one possibility.

The vehicle modules 208 may include various vehicle 31 components configured to receive updates of associated software, firmware, or configuration settings. For instance, the vehicle modules 208 may be configured to implement an update interface of vehicle bus commands including a command to invoke a software update mode for the vehicle module 208, a command to receive updated configuration or software data to be applied to the vehicle module 208, and a command to reset the vehicle module 208 and reload the configuration and software data via a standby EEPROM 202. As some non-limiting examples, the vehicle modules 208 may include a powertrain control module (PCM), a telematics control module (TCM), a brake system control module (BSCM), and body control module (BCM).

The software update management module 214 may be configured to access an in-vehicle network to communicate with the vehicle modules 208. In an example, the in-vehicle network may be a vehicle controller area network (CAN). When a vehicle 31 is assembled, the vehicle 31 may include various hardware and software components. Upon or after assembly, the software update management module 214 may be configured to query for existence and version information for at least a portion of these hardware and software components of the vehicle modules 208 of the vehicle 31.

The software update management module 214 may be further configured to access the VCS 1 to communicate with the update server 218 over the network 61. Using the queried information and additional information identifying the specific vehicle 31 (e.g., VIN information published on the CAN bus, subscriber identity module (SIM) information of the modem 63 such as international mobile station equipment identity (IMEI), etc.), the software update management module 214 may communicate via the network 61 to establish an account with the update server 218. The update server 218 may receive these communications from the vehicles 31, and may maintain a software data store 220 of vehicle configuration 222 information related to the received hardware configurations and software (e.g., firmware, etc.) versions linked to identifiers of the vehicles 31.

The software data store 220 may be further configured to store software updates 224 that may be provided to the vehicle 31. The software updates 224 may include, for example, updated configuration settings for one or more vehicle 31 modules, and/or updated versions of software or firmware to be installed on one or more vehicle 31 modules. The software updates 224 may also include, for example, additional applications that may be available for download to the vehicle 31.

The software data store 220 may be further configured to store additional information about the software updates 224. For example, the software data store 220 may be configured to maintain an optional/required flag regarding the software updates 224 allowing the vehicles 31 to determine which software updates 224 are necessary and which are optional (e.g., an optional flag). As another example, the software data store 220 may be configured to maintain indications of which vehicle module(s) 208 are associated with which software updates 224. The software data store 220 may further store information indicative of the compatibility of the software updates 224 to vehicle model or configuration. For instance, a storage entry for a software update 224 may indicate that the software update 224 is compatible with a certain make and model of vehicle 31, or that it has a dependency on a version of another vehicle module 208 being of a particular version or versions.

The software update application may be configured to receive an indication to initiate providing of software updates 224. As one possibility, the software update application of the VCS 1 may receive a command request from a user requesting to check for software updates 224. As another possibility, the software update management module 214 may trigger a periodic check for new software updates 224, and may provide an indication of the triggered request to the software update application. Upon request by the user or by the software update management module 214, the software update application may be configured to send a request to the update server 218 to inquire whether software updates 224 for the vehicle 31 are available. For example, the software update application may query the update server 218 using an identifier of the vehicle 31 (e.g., vehicle 31 VIN, vehicle 31 SIM information, etc.) and may receive a response from the update server 218 indicative of whether new software updates 224 for the vehicle 31 are available (e.g., as links or other identifiers of software updates 224 for the vehicle 31 to download).

The software update application may be further configured to provide a user interface for the software update management module 214 to the user via the VCS 1. For example, the software update application may be configured to provide a prompt to the user (e.g., via the display 4 or speaker 13 of the VCS 1) informing the user that software updates 224 are available and requesting permission to proceed with installation of the software updates 224. As another possibility, the software update application may be configured to provide an indication of available updates within the gauge cluster of the vehicle 31 when software updates 224 are available (e.g., downloaded).

Once the user confirms that the software updates 224 should be installed, the software update management module 214 may be configured to support various functions useful in support of the updating of the software of the vehicle modules 208. For example, the software update management module 214 may be configured to invoke a software update mode, for the vehicle modules 208 identified by the software updates 224 as recipients of the software updates 224, by providing a message from the software update management module 214 to the recipient vehicle modules 208 over the vehicle bus. The software management module 214 may transmit a message to the VCS 1 to determine whether the software update may be uploaded to an available EEPROM 202 not being used by the one or more modules 208. The vehicle system 200 may comprises two or more EEPROMs 202. The vehicle system 200 may alternate between the two or more EEPROMs 202 such that a current version of the software may be stored at one EEPROM 202A and executed by the VCS 1 while the other EEPROM 202B may be available to receive a software update.

In one example, the software update application may be configured to automatically accept software updates 224 that are available for the one or more modules 208 in communication with the VCS 1. The VCS 1 may control a switch circuit 206 to communicate with one EEPROM 202A. The switch circuit 206 enables the EEPROM 202A to transmit software to the one or more modules for execution. The switch circuit 206 may enable the EEPROM 202B to be available for software updates without disrupting the VCS 1. The software update management module 214 may receive the software update and transmit it to the EEPROM 202B not currently being used by the one or more modules 208 and/or the VCS 1. At an initialization event, the VCS 1 may control the switch circuit 206 such that the EEPROM 202B that received the updated software is now in communication with the one or more modules 208, thus, now leaving the other EEPROM 202A available for a software update.

The software update management module 214 may be further configured to transfer the software updates 212 to the available EEPROM 202 not currently being used by the vehicle modules 208 via the vehicle bus. The vehicle system may enable the software update via the EEPROM 202 to be used by the recipient vehicle modules 208 upon an initialization event. The initialization event enables the VCS to determine if a software update has been completed and therefore causes the switch circuit to connect the EEPROM 202 with the software update with the vehicle modules 208 to reload and utilize the updated software. The software update management module 214 may also be configured to perform diagnostic functions regarding success of the update procedure by reading diagnostic codes via the vehicle bus.

In prior systems, the software update may require the vehicle to be inoperable since an assigned EEPROM has to be reflashed with the software update. The use of two or more EEPROMs 202 enables the vehicle system 200 to perform a software update while allowing the module 208 to continue to communicate with the EEPROM 202 having the current software being executed while the available EEPROM is flashed with the updated software. Further aspects of the operation of the software update management module 214 and software update application using two or more EEPROMs are discussed with respect to FIG. 3A, FIG. 3B, and FIG. 4 below.

Figure 3A:
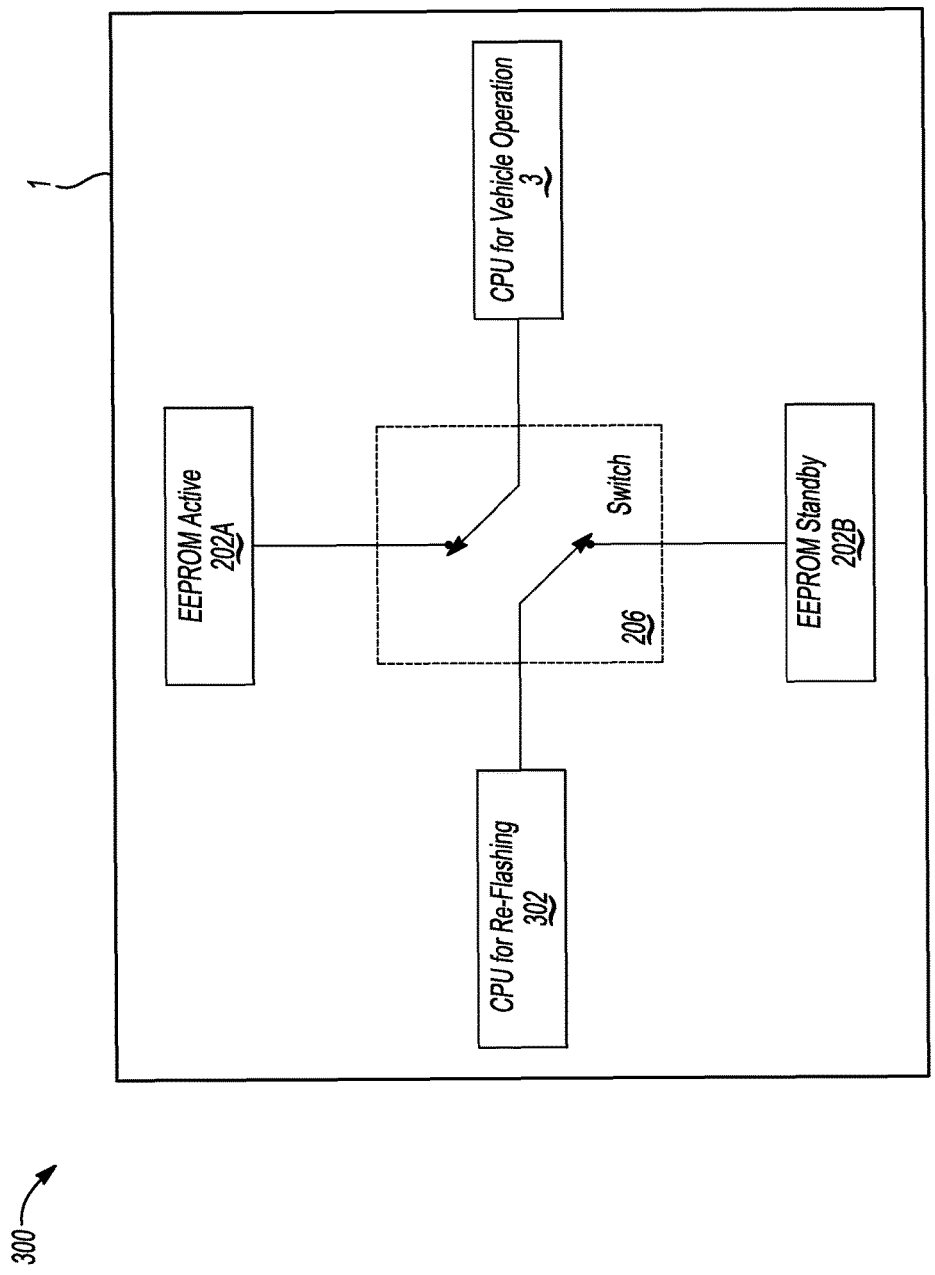
FIG. 3A illustrates an example of a programmable memory circuit for the vehicle-based computing system.

FIG. 3A illustrates an example of a programmable memory circuit 300 for the VCS 1. The VCS 1 may comprise an active EEPROM 202A transmitting software to a CPU 3 configured for vehicle operation and another CPU 302 configured for reflashing a standby EEPROM 202B with a software update. The VCS 1 may control a switch 206 to assign an EEPROM 202 to the CPU 3. The switch 206 circuit is made of two parts, each of which is comprised of two groups of field-effect transistors (FETs). The two parts of the switching circuits operate identically, except one is wired to EEPROM 202A, and the other to EEPROM 202B. Within the part wired to EEPROM 202A, a first group of FETs (FET1) is located to make a connection between the address lines of the CPU 3 for vehicle control and the EEPROM 202A. When the FET's are activated, the connection is made between the address lines of the two chips. When the FETs are off, the connection is open. The second group of FETs (FET2) are located to make a connection between the address lines of the CPU 302 for flashing and EEPROM 202A memory chips. When the FET's are activated, the connection is made between the two chips. When the FET is off, the connection is open. By activating the first group of FETs while deactivated the second group of FETs, the memory is connected exclusively to the CPU 3 for vehicle control. Conversely, de-activating the first group of FETs while activated the second group of FETs, the memory is connected exclusively to the CPU 302 for flashing. In a similar way, a third and fourth group of FETs control the connections of EEPROM 202B.

For example, FET1 high with FET2 low connects EEPROM 202A to the CPU 3 for vehicle control, and FET3 low with FET4 high connects EEPROM 202B to the CPU 302 for flashing. As such, the detail function of the circuit is given. It may be observed that FET1 and FET2 are always opposite, and that FET3 and FET4 are always opposite, and therefore do not need to be individually notated. Furthermore, FET3 and FET1 are always opposites. Thus, the operation of the circuit 300 may be more simply described as when FET1 is high, EEPROM 202A connects to the CPU 3 for vehicle control and EEPROM 202B connects to the CPU 302 for flashing. When FET1 is low, EEPROM 202A connects to the CPU 302 for flashing and EEPROM 202B connects to the CPU 3 for vehicle control.

In another example, the VCS 1 may enable the active EEPROM 202A to communicate with the CPU 3 for vehicle operation. The VCS 1 may be notified that the standby EEPROM 202B has received an updated software flash via the CPU 302 in communication with the update server 218.

For example, the VCS 1 may control the switch 206 during a key-on event such that the CPU 3 operating the vehicle system is in communication with the EEPROM 202A comprising software available for execution. The VCS 1 may control the switch 206 such that the CPU 302 designated for receiving the updated software is in communication with the EEPROM 202B not used during vehicle operation. The standby EEPROM 202B may receive a software update from the update server 218. The software update may be received by the standby EEPROM 202B without any interruption to the operation of the vehicle. The VCS 1 may receive a message once the upload of the software update is complete at the standby EEPROM 202B. The VCS 1 may generate a message notifying a vehicle user that a software update is available. The VCS 1 may output the message at the display 4. The vehicle user may have the option to accept the software update such that the VCS 1 receives the software update at the next vehicle key-on event. In another embodiment, the vehicle user may have the option to accept the software update such that the VCS performs a reinitialization event. In response to the vehicle user's acceptance of the software update, and at the next key-on event, the VCS 1 may control the switch such that the standby EEPROM 202B is now in communication with the CPU 3 operating the vehicle. The once active EEPROM 202A is now in communication with the CPU 302 designated for receiving updated software.

In another example, the CPU 3 configured for vehicle operation may receive a software update message. The software update message may provide information to the CPU 3 that the second EEPROM 202B received a software update. In response to an initialization event, the CPU 3 may control the switch circuit 206 based on the software update message. The CPU 3 may transmit a signal to the switch circuit 206 to establish communication with the second EEPROM 202B containing the updated software. In other embodiments, the CPU 302 configured to flash the available EEPROM and/or an additional processor (not shown) may be added to the circuit for controlling the switch 206.

Figure 3B:
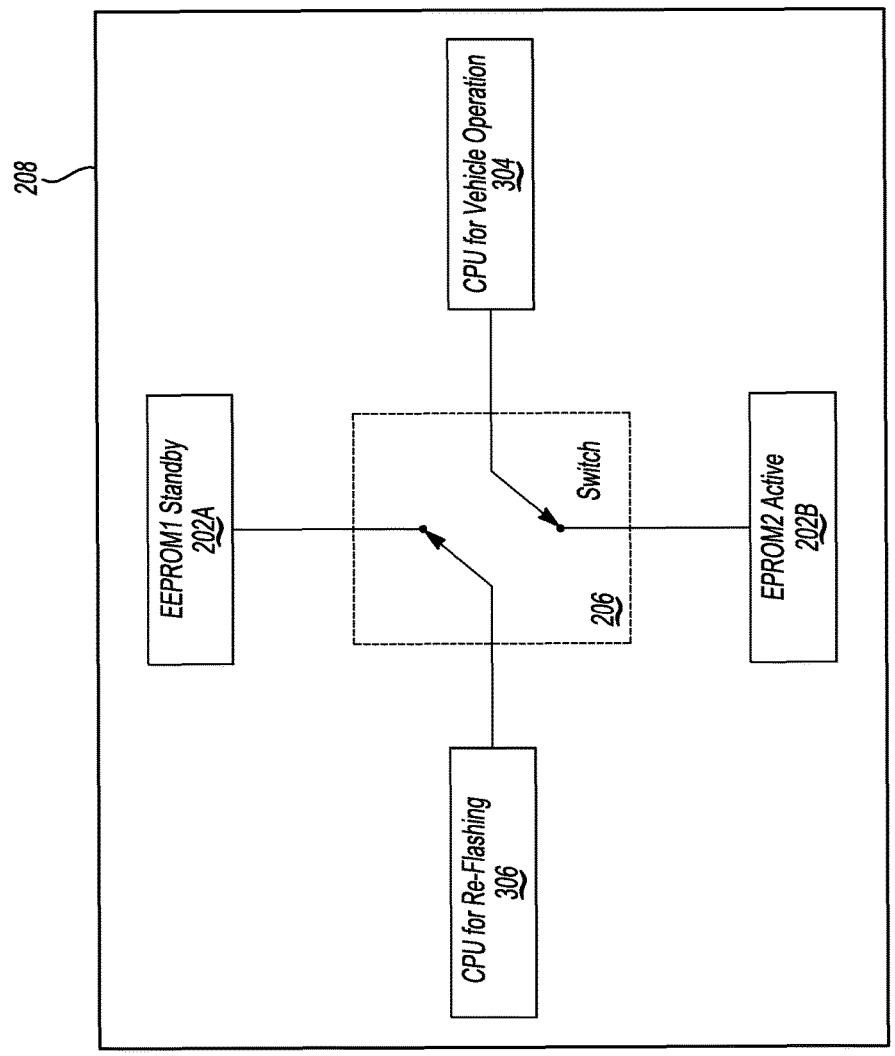
FIG. 3B illustrates an example of the programmable memory circuit for a vehicle module in communication with the vehicle-based computing system.

FIG. 3B illustrates an example of the programmable memory circuit 350 for a vehicle module 208 in communication with the VCS 1. The vehicle module 208 may comprise the EEPROM 202B transmitting software to the CPU 304 configured for vehicle operation and another CPU 306 configured for re-flashing a standby EEPROM 202A.

For example, the VCS 1 may receive a software update from at least one of a remote server (e.g., the update server 218), a USB drive via the USB 23 port, and/or a combination thereof. The VCS 1 may communicate with the update server 218 using one or more wireless communication devices including an embedded cellular telephone, embedded modem, a connected nomadic device 53 in communication with update server 218, and/or a combination thereof.

In one example, the VCS 1 may receive the software update from a USB drive via the USB 23 port. The VCS 1 may manage the data received from the USB 23 port and may transmit the software update to the respective vehicle module 208. The vehicle module 208 may receive the software update via the CPU 306 configured for re-flashing a standby EEPROM 202A. The vehicle module may continue to operate one or more vehicle system without interruption from the software update being received at the EEPROM 202A. The vehicle module 208 may continue to perform one or more functions based on the CPU 304 configured for vehicle operation by executing software received from the active EEPROM 202B.

The vehicle system may receive a software update notification from the vehicle module 208. In response to the software update notification, the vehicle module 208 may enable the switch to transmit a request such that the CPU 304 configured for vehicle operation may now be in communication with the EEPROM 202A that received the updated software. The vehicle module 208 may enable the switch 206 to toggle to the EEPROM 202A comprising the software update at an initialization event. The initialization event may include, but is not limited to a key-on, key-off, and/or a system reinitialization event.

Figure 4:
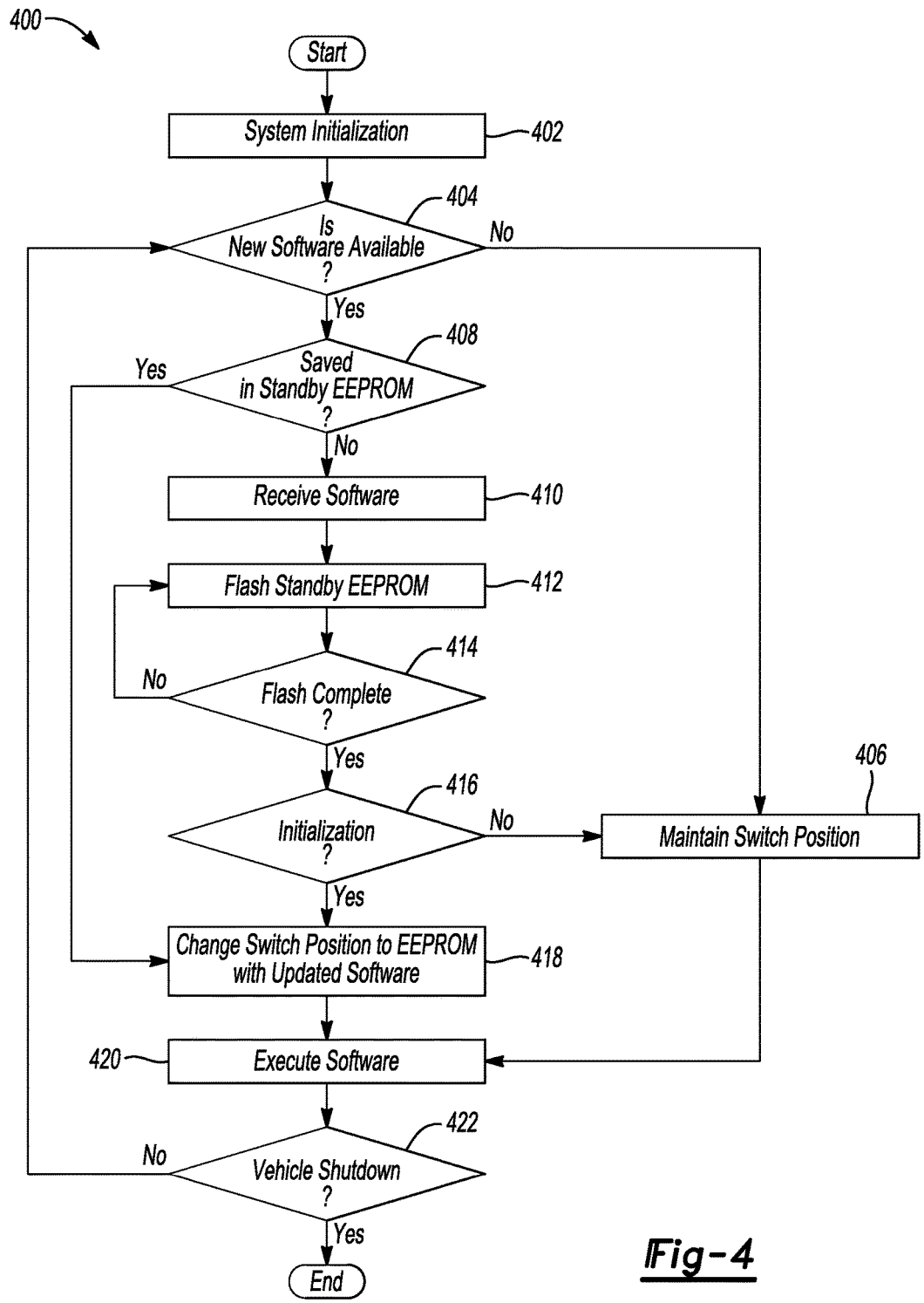
FIG. 4 is a flow chart illustrating an example method for managing software updates using the programmable memory circuit.

FIG. 4 is a flow chart illustrating an example method 400 for managing software updates using the programmable memory circuit. The software update method may comprise one or more software applications that are executed on hardware at the vehicle system. The one or more applications may include instructions to communicate with one or more components of the vehicle and manage software updates to an available EEPROM without disrupting vehicle operation. The method 400 may be implemented using software code contained within the VCS 1. In other embodiments, the method 400 may be implemented in other vehicle controllers, at a remote server in communication with the VCS 1, distributed amongst multiple vehicle controllers, or a combination thereof.

Referring again to FIG. 4, the vehicle and its components illustrated in FIG. 1, FIG. 2, FIG. 3A and FIG. 3B are referenced throughout the discussion of the method 400 to facilitate understanding of various aspects of the present disclosure. The method 400 of updating software while the vehicle is being operated may be implemented through a computer algorithm, machine executable code, or software instructions programmed into a suitable programmable logic device(s) of the vehicle, such as the vehicle control module, a control module at the remote server, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the vehicle system may comprise an initialization event that may include one or more data variables to be configured for a vehicle operation start event. In response to a system initialization, the vehicle system may determine if new software is available for execution in operation 404. The system may maintain an existing switch position such that the active EEPROM continues to transmit software to the CPU configured for vehicle operation if no new software is available in operation 406.

In operation 408, if new software is available, the vehicle system may determine if the new software is saved at the standby EEPROM. If the new software is saved at the standby EEPROM, the system may change the switch position such that the EEPROM with the updated software is in communication with the CPU configured to operate the vehicle in operation 418.

In operation 410, if the new software is not at the standby EEPROM, the system may establish communication with the remote server to receive the updated software. The server may wirelessly transmit the updated software to the system. The system may receive the software from the server. The system may flash the standby EEPROM via a CPU configured for re-flashing the standby EEPROM not currently being used by the vehicle system in operation 412.

In operation 414, the system may determine when the flash of the standby EEPROM is complete. In response to a EEPROM being flashed with updated software, the system may continue to monitor if an initialization event has occurred in operation 416. If an initialization event is not detected, the system may maintain the switch position in operation 406.

In operation 418, if an initialization event is detected, the system may change the switch position such that the EEPROM with the updated software is in communication with the CPU configured for vehicle operation. The CPU configured for vehicle operation may execute the updated software in operation 420.

In operation 422, the vehicle system may monitor for a key off event. If a key off event is not detected, the system may continue to manage software updates to the standby EEPROM. If a key off event is detected, the system may begin to power down one or more modules storing one or more variables in non-volatile memory while preparing the system to execute the updated software at the standby EEPROM. Once the standby EEPROM becomes the active EERPOM, the system may prepare the previously active EEPROM through communication with the CPU for re-flashing as a standby EEPROM.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computing system comprising a first memory device in selective communication with either a first processor that executes one or more vehicle operations or a second processor that receives software updates;
   a second memory device in selective communication with either the second processor or the first processor;
   a first switch circuit that selectively switches between the first processor and the first and second memory devices; and
   a second switch circuit that selectively switches between the second processor and the first and second memory devices, wherein the second processor is configured to receive and store a software update in the second memory device while the first processor is in communication with the first memory device, wherein the vehicle computing system is configured to, receive notification that the software update is available at the second memory device, and responsive to receiving the notification:

automatically control the first switch circuit to toggle communication with the first processor from the first memory device to the second memory device for execution of the software update by the first processor from the second memory device, and automatically control the second switch circuit to toggle communication with the second processor from the second memory device to the first memory device.

2. The vehicle computing system of claim 1, wherein the first and second memory devices comprise at least one of an electrically erasable programmable read only memory (EE-PROM), a FLASH, random access memory, and read only memory.

3. The vehicle computing system of claim 1, wherein the second processor is configured to receive the software update device during vehicle operation.

4. The vehicle computing system of claim 1, further comprising a communication module configured to establish remote communication with one or more devices such that the communication module receives the software update from the one or more devices and sends the software update to the second memory device via the second processor.

5. The vehicle computing system of claim 4, wherein the communication module is at least one of an embedded cellular phone, a Bluetooth module, and an embedded modem.

6. The vehicle computing system of claim 4, wherein the one or more devices is at least one of a remote server and a nomadic device.

7. The vehicle computing system of claim 4, wherein the communication module is configured to, in response to initiation of a key-off event, continue to receive the software update until the first processer receives a software update success message before completing the key-off event, and store the software update at the second memory device via the second processor.

8. The vehicle computing system of claim 1, wherein the first processor is further configured to, in response to an initialization event, transmit a request to determine if the first or second memory device includes the software update.

9. The vehicle computing system of claim 8, wherein the initialization event is at least one of an ignition key-on, ignition key-off, and a manually initiated event.

10. The vehicle computing system of claim 1, wherein the first and second switch circuits comprise at least two field-effect transistors.

* * * * *